US011879274B2

(12) United States Patent
Ku et al.

(10) Patent No.: US 11,879,274 B2
(45) Date of Patent: Jan. 23, 2024

(54) LOCK ASSEMBLY FOR A BICYCLE

(71) Applicant: CANDY HOUSE INC., Palo Alto, CA (US)

(72) Inventors: Che-Ming Ku, Taipei (TW); Wen Hang Su, Palo Alto, CA (US); Ching-Huang Hu, Chang-Hua (TW); Hui Qing Zhang, Chang-Hua (TW)

(73) Assignee: CANDY HOUSE INC., Palo Alto, CA (US)

( * ) Notice: Subject to any disclaimer, the term of this patent is extended or adjusted under 35 U.S.C. 154(b) by 315 days.

(21) Appl. No.: 17/519,474

(22) Filed: Nov. 4, 2021

(65) Prior Publication Data

US 2022/0145670 A1 May 12, 2022

(30) Foreign Application Priority Data

Nov. 9, 2020 (TW) ................................ 109139020

(51) Int. Cl.
*E05B 71/00* (2006.01)

(52) U.S. Cl.
CPC .................................... *E05B 71/00* (2013.01)

(58) Field of Classification Search
CPC .. E05B 71/00; B62H 3/00; B62H 5/00; B62H 5/14; B62H 5/141
USPC ........................................................... 70/236
See application file for complete search history.

(56) References Cited

U.S. PATENT DOCUMENTS

| | | | |
|---|---|---|---|
| 2016/0040453 A1 | 2/2016 | Matre | |
| 2016/0326773 A1 | 11/2016 | Tobias et al. | |

FOREIGN PATENT DOCUMENTS

| | | | | |
|---|---|---|---|---|
| CN | 2100448 U | * | 4/1992 | |
| CN | 2102975 U | * | 4/1992 | |
| CN | 211818669 U | | 10/2020 | |
| CN | 109154166 B | | 11/2020 | |
| EP | 1717135 A1 | * | 11/2006 | ............ B62H 5/147 |
| TW | 201901005 A | | 1/2019 | |
| WO | WO-2019098180 A1 | * | 5/2019 | .............. B62H 5/00 |

OTHER PUBLICATIONS

"SwitchBot Bot—The Iconic Button Presser." SwitchBot, 2021.
Search Report appended to a Notice of Allowance, which was issued to Taiwanese counterpart application No. 109139020 by the TIPO dated May 5, 2021, with an English translation thereof.

* cited by examiner

*Primary Examiner* — Nathan Cumar
(74) *Attorney, Agent, or Firm* — Hamre, Schumann, Mueller & Larson, P.C.

(57) ABSTRACT

A lock assembly includes a casing, a blocking unit, and a lock unit. The blocking unit includes a blocking member operable to move between an open position and a block position. The lock unit includes an engaging member, an electric unlock module, and a manual unlock module. The engaging member has a main body having first and second abutment portions, and is movable between an engaging position for engaging the blocking member when the blocking member is in the block position, and an unlocked position for disengaging from the blocking member. One of the electric unlock module and the manual unlock module is operable to abut a push member thereof against a corresponding one of the first and second abutment portions to linearly move the engaging member.

10 Claims, 13 Drawing Sheets

LOCK ASSEMBLY FOR A BICYCLE

CROSS-REFERENCE TO RELATED APPLICATION

This application claims priority of Taiwanese Patent Application No. 109139020, filed on Nov. 9, 2020.

FIELD

The disclosure relates to a lock assembly, and more particularly to a lock assembly for a bicycle.

BACKGROUND

A conventional lock assembly for a bicycle is mounted on the bicycle for immobilizing a wheel of the bicycle when it is locked for securing the bicycle against theft. The conventional lock assembly is usually configured to be openable only by a key. During a use of the conventional lock assembly, a user must carry the key for the conventional lock assembly, which is usually so tiny that it is very easy to lose. Such loss of the key makes the conventional lock assembly inoperable.

SUMMARY

Therefore, an object of the disclosure is to provide a lock assembly for a bicycle that can alleviate the drawback of the abovementioned prior art.

According to an aspect of the disclosure, the lock assembly includes a casing, a blocking unit, a lock unit, and a power supply unit. The blocking unit includes a blocking member and a knob. The blocking member has an engaging slot and is operable to move between an open position, where the blocking member is inside the casing, and a block position, where the blocking member protrudes from the casing. The knob extends into the casing, is connected to the blocking member, and is configured to be operable manually for driving the blocking member toward the block position. The lock unit is mounted within the casing and includes a mount base, an engaging member, a biasing member, an electric unlock module, and a manual unlock module. The engaging member has a main body that is disposed in the mount base, and a pin that is connected to the main body. The main body of the engaging member has a first abutment portion and a second abutment portion. The engaging member is movable between an engaging position, where the pin engages the engaging slot when the blocking member is in the block position so as to prevent movement of the blocking member, and an unlocked position, where the pin is disengaged from the engaging slot so as to allow movement of the blocking member. The biasing member is disposed between the mount base and the engaging member for biasing the engaging member toward the engaging position. The electric unlock module has a motor, a first push member that is connected to the motor, and a controller. The motor is operable for driving the first push member to abut against the first abutment portion of the main body of the engaging member and to move the engaging member. The controller is electrically connected to the motor for controlling operation of the motor. The manual unlock module has a lock cylinder that is rotatable and that has a keyhole adapted for insertion of a key, and a second push member that is connected co-rotatably to the lock cylinder. Rotation of the lock cylinder is actuated upon rotation of the key to drive the second push member to abut against the second abutment portion of the main body of the engaging member and to move the engaging member. The engaging member is operable by one of the electric unlock module and the manual unlock module to move to the unlocked position. The power supply unit is electrically connected to the electric unlock module.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
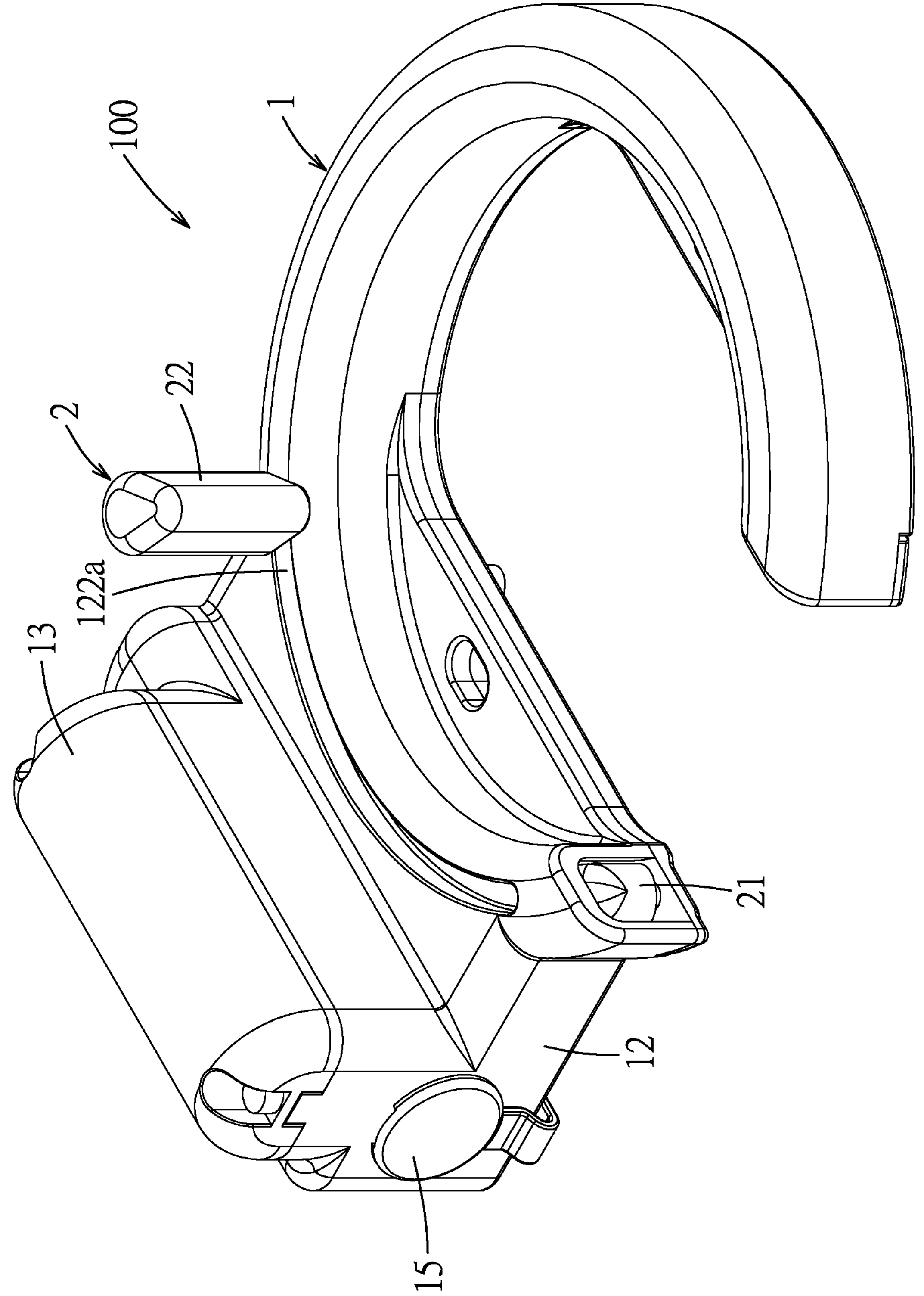
FIG. 1 is a perspective view illustrating an embodiment of a lock assembly according to the disclosure, in which a blocking member of a blocking unit is in an open position.
Figure 4:
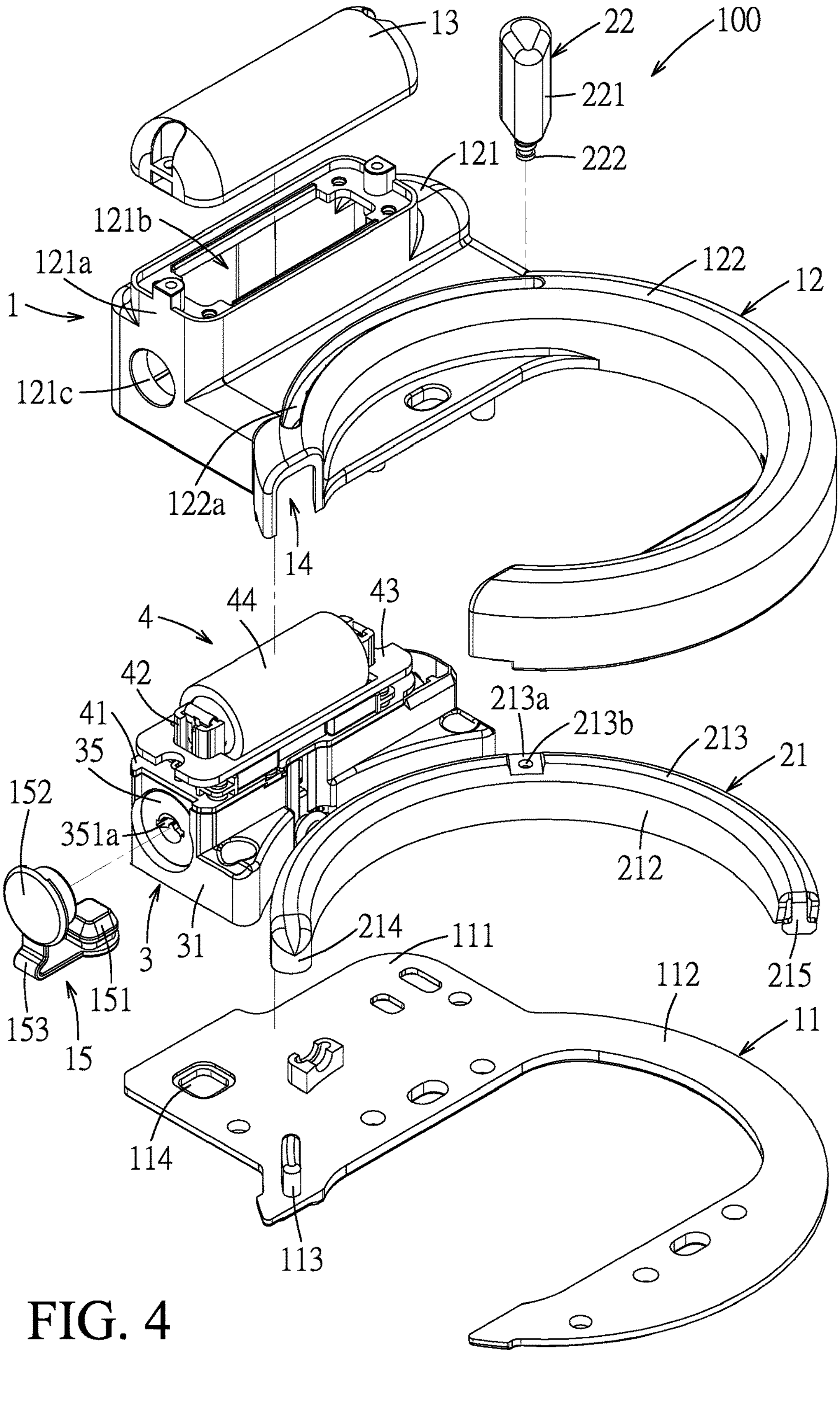
FIG. 4 is another partly exploded perspective view illustrating the embodiment.

Referring to FIGS. 1 and 4, a lock assembly 100 according to an embodiment of the present invention is adapted to be mounted on a bicycle (not shown) for immobilizing a wheel of the bicycle when locked and securing the bicycle against theft, and includes a casing 1, a blocking unit 2, a lock unit 3, and a power supply unit 4.

Figure 3:
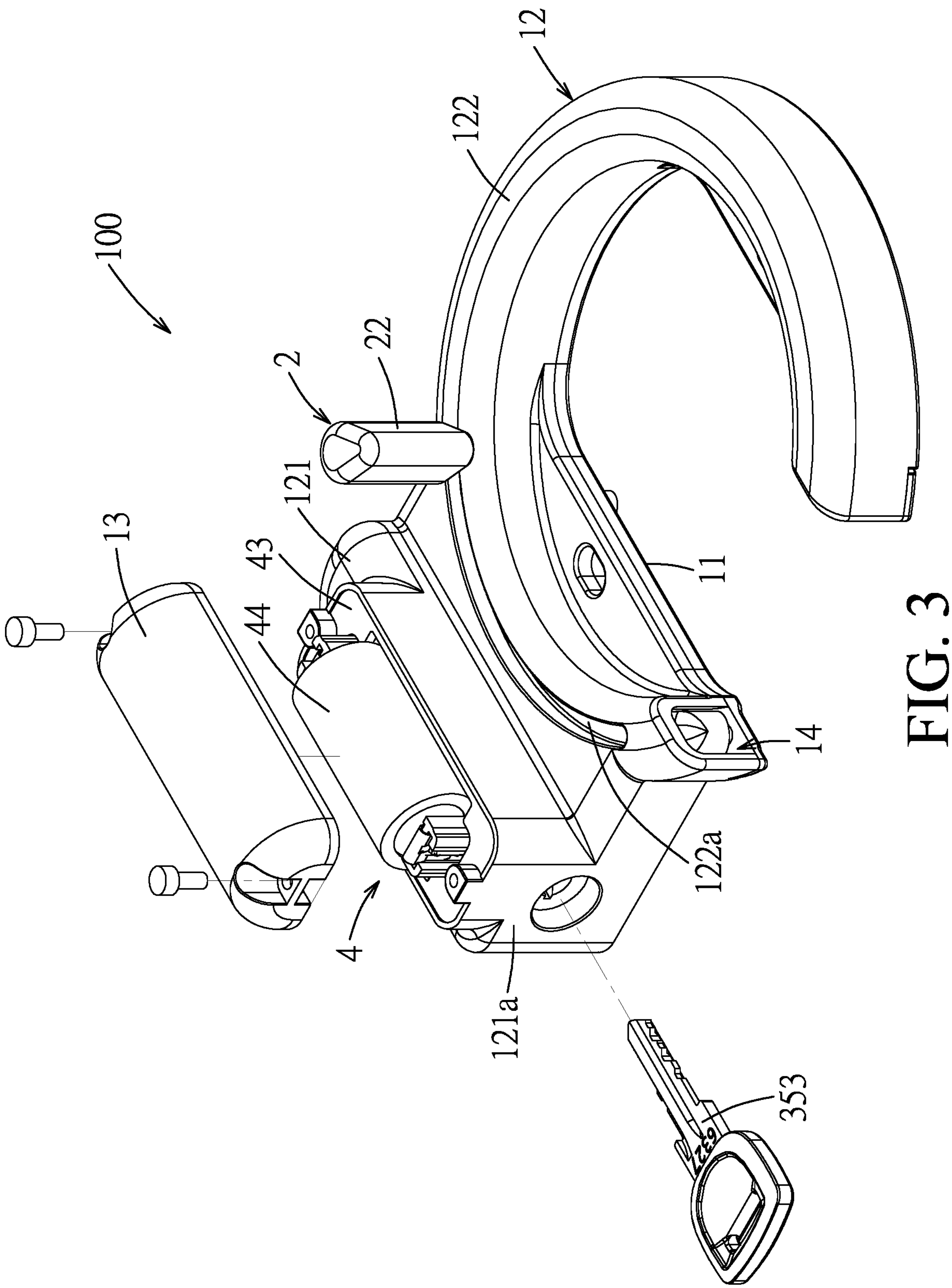
FIG. 3 is a partly exploded perspective view illustrating the embodiment.
Figure 5:
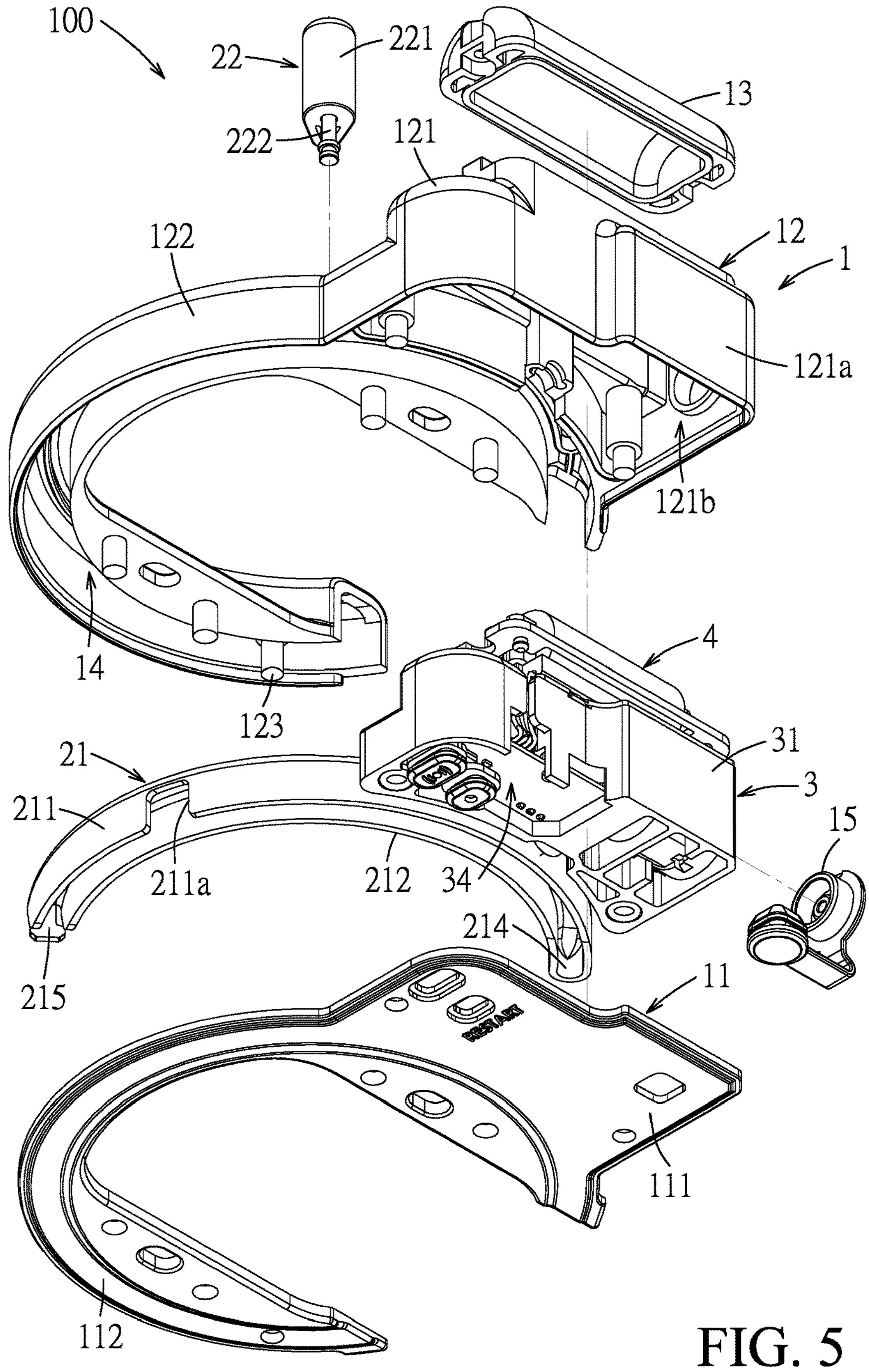
FIG. 5 is still another partly exploded perspective view illustrating the embodiment.

Referring to FIGS. 3 to 5, the casing 1 includes a base plate 11, a casing body 12, and a cover body 13. The base plate 11 has a main plate part 111 and a C-shaped plate part 112 that extends from the main plate part 111. The casing body 12 has a main casing part 121 that is coupled to the main plate part 111, a C-shaped casing part 122 that extends from the main casing part 121 and that is coupled to the C-shaped plate part 112 so as to cooperate with the C-shaped plate part 112 to define a track space 14 therebetween, and a fixing pole 123 protruding from the C-shaped casing part 122 into the track space 14. The main casing part 121 has a surrounding wall 121*a* that defines an accommodating space 121*b*. The C-shaped casing part 122 is formed with a curved slot 122*a* that extends along the C-shaped casing part 122 and that is in spatial communication with the track space 14.

The cover body 13 is removably disposed on the main casing part 121 and removably covers the accommodation space 121*b*.

The blocking unit 2 includes a blocking member 21, and a knob 22 that extends into the casing 1 and that is connected to the blocking member 21.

Figure 2:
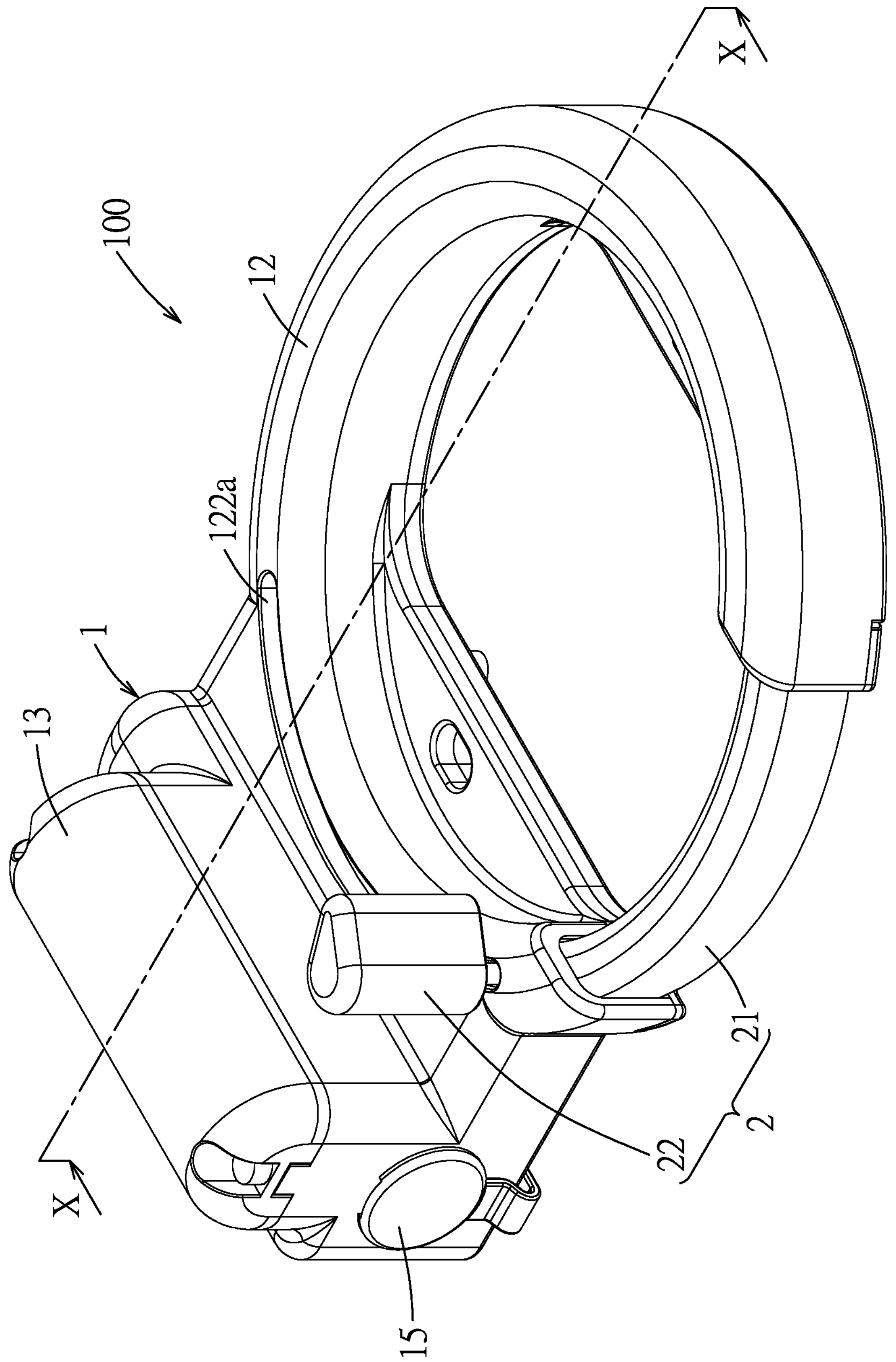
FIG. 2 is a perspective view illustrating the embodiment, in which the blocking member of the blocking unit is in a block position.

The blocking member 21 is operable to move between an open position, where the blocking member 21 is inside the casing 1 and disposed within the track space 14 (See FIG. 3), and a block position, where the blocking member 21 protrudes from the casing 1 and cooperates with the C-shaped casing part 122 to form a closed loop structure (See FIG. 2).

Figure 6:
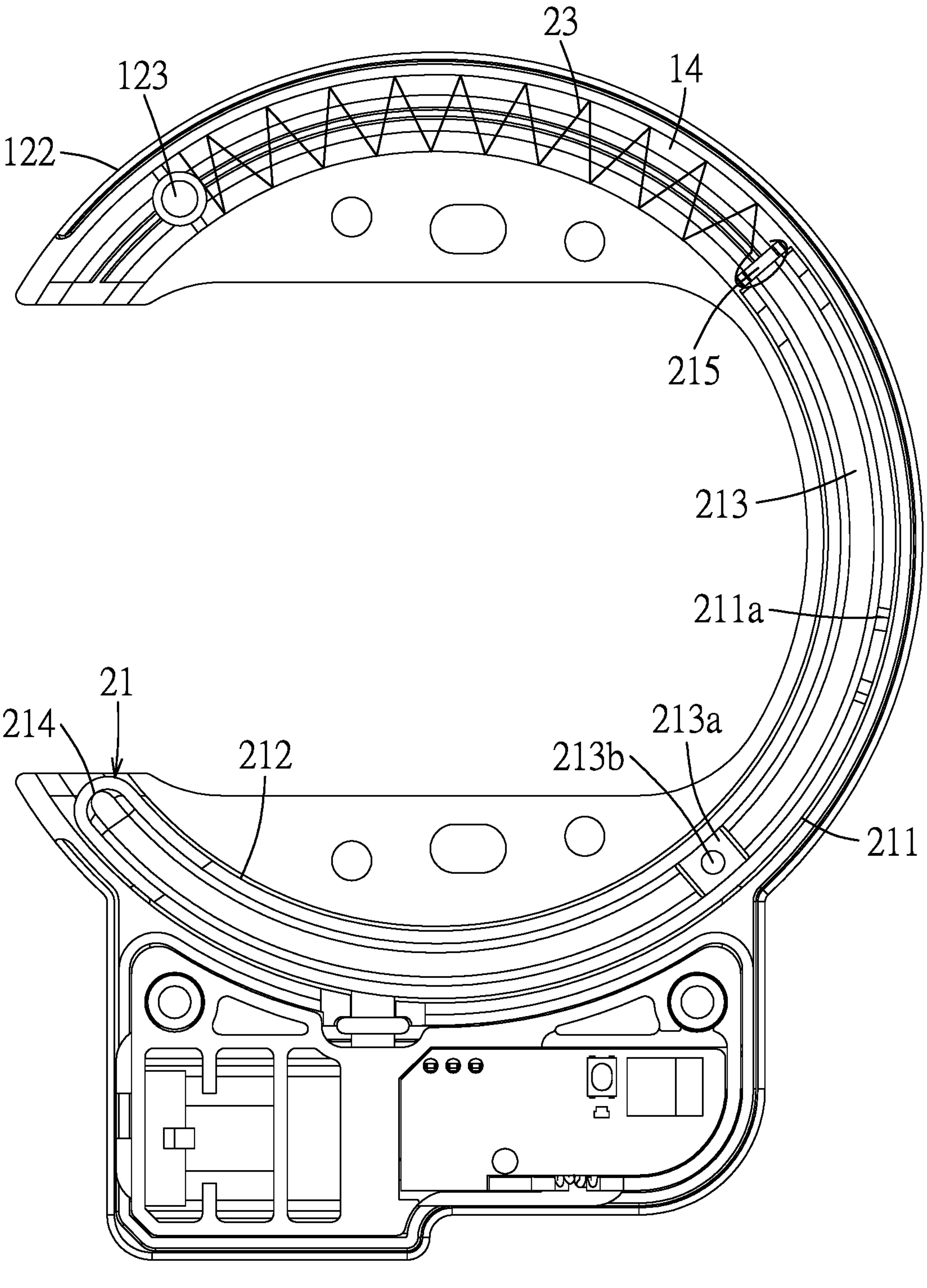
FIG. 6 is a bottom view illustrating the embodiment with a base plate of a casing being omitted.

Specifically, as shown in FIGS. 4 to 6, the blocking member 21 has an arc-shaped outer wall 211, an arc-shaped inner wall 212 arranged at an inner side of the arc-shaped outer wall 211 and being substantially parallel to the arc-shaped outer wall 211, an arc-shaped top wall 213 interconnecting top ends of the arc-shaped outer wall 211 and the arc-shaped inner wall 212, an end wall 214 interconnecting an end of the arc-shaped outer wall 211, an end of the arc-shaped inner wall 212, and an end of the arc-shaped top wall 213, and an extension wall 215 extending from another end of the arc-shaped top wall 213 and connected to another end of the arc-shaped outer wall 211 and another end of the arc-shaped inner wall 212. The arc-shaped outer wall 211 is formed with an engaging slot 211*a*. The arc-shaped top wall 213 has a connecting area 213*a* formed with a threaded hole 213*b*.

The knob 22 has a threaded rod portion 222 that extends through the curved slot 112*a* and that has an end connected to the arc-shaped top wall 213, and a head portion 221 that is connected to another end of the connecting portion 222 and that is accessible to a user such that the knob 22 is operable manually by the user to move along the curved slot 112*a* for driving the blocking member 21 toward the block position. Specifically, the end of the threaded rod portion 222 threadedly engages the threaded hole 213*b* of the arc-shaped top wall 213.

Further referring to FIG. 6, in this embodiment, the blocking unit 2 further includes a resilient member 23 having an end that is connected to the extension wall 215 of the blocking member 21 and an opposite end that is connected to the fixing pole 123 of the casing body 12 for biasing the blocking member 21 toward the open position.

The base plate 11 further has a stopper block 113 that protrudes from the C-shaped plate part 112 into the track space 14 for positioning the blocking member 21 relative to the casing 1 while the blocking member 21 is in the open position. Specifically, the stopper block 113 is configured to abut against the end wall 214 of the blocking member 21 when the blocking member 21 is moved to the open position so as to hold the blocking member 21 at the open position.

Figure 7:
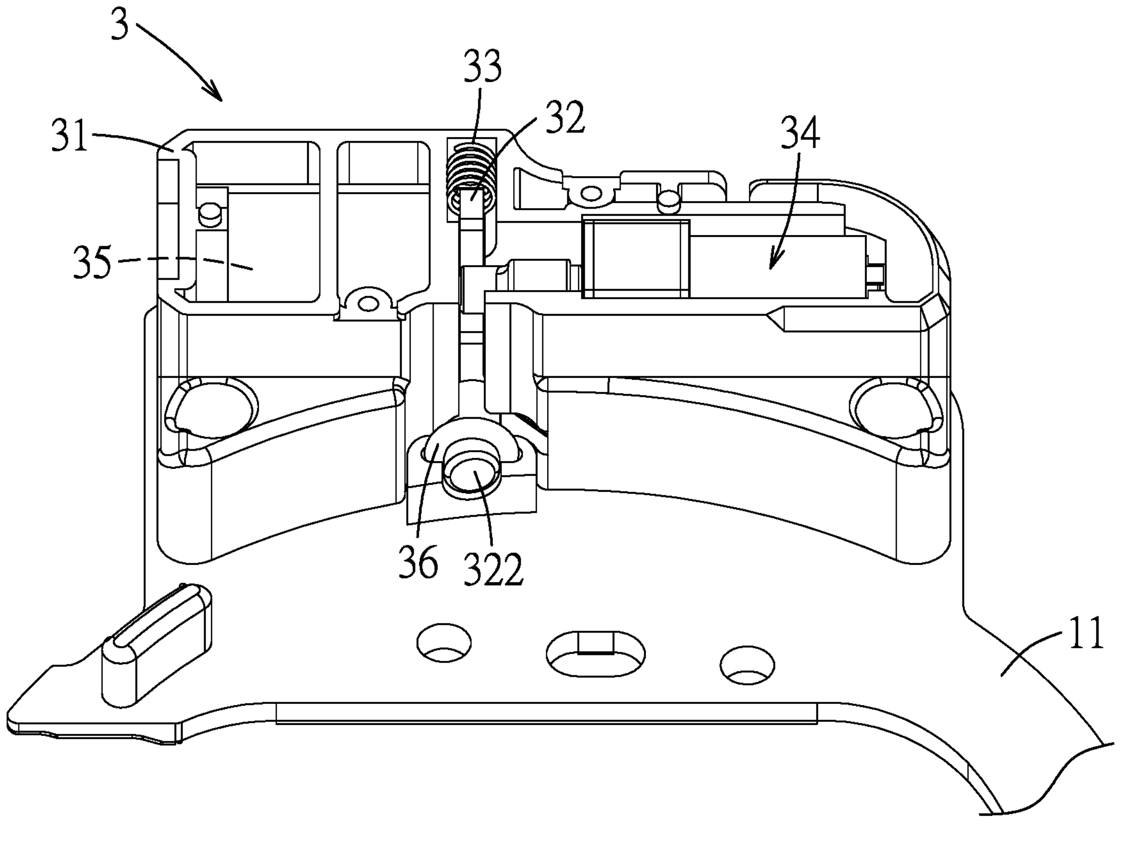
FIG. 7 is a fragmentary perspective view of the base plate and a lock unit of the embodiment.
Figure 8:
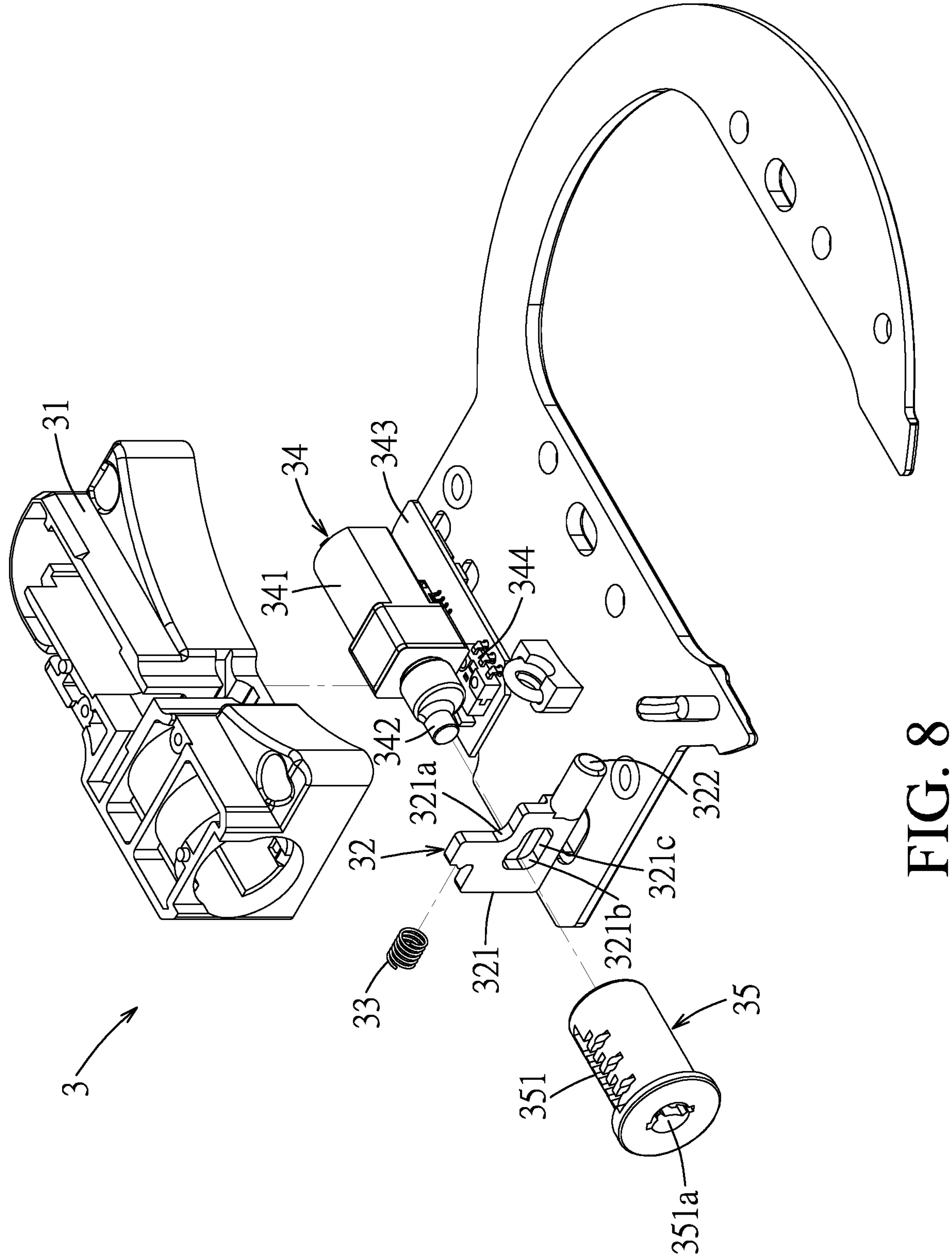
FIG. 8 is an exploded perspective view of the base plate and the lock unit.
Figure 9:
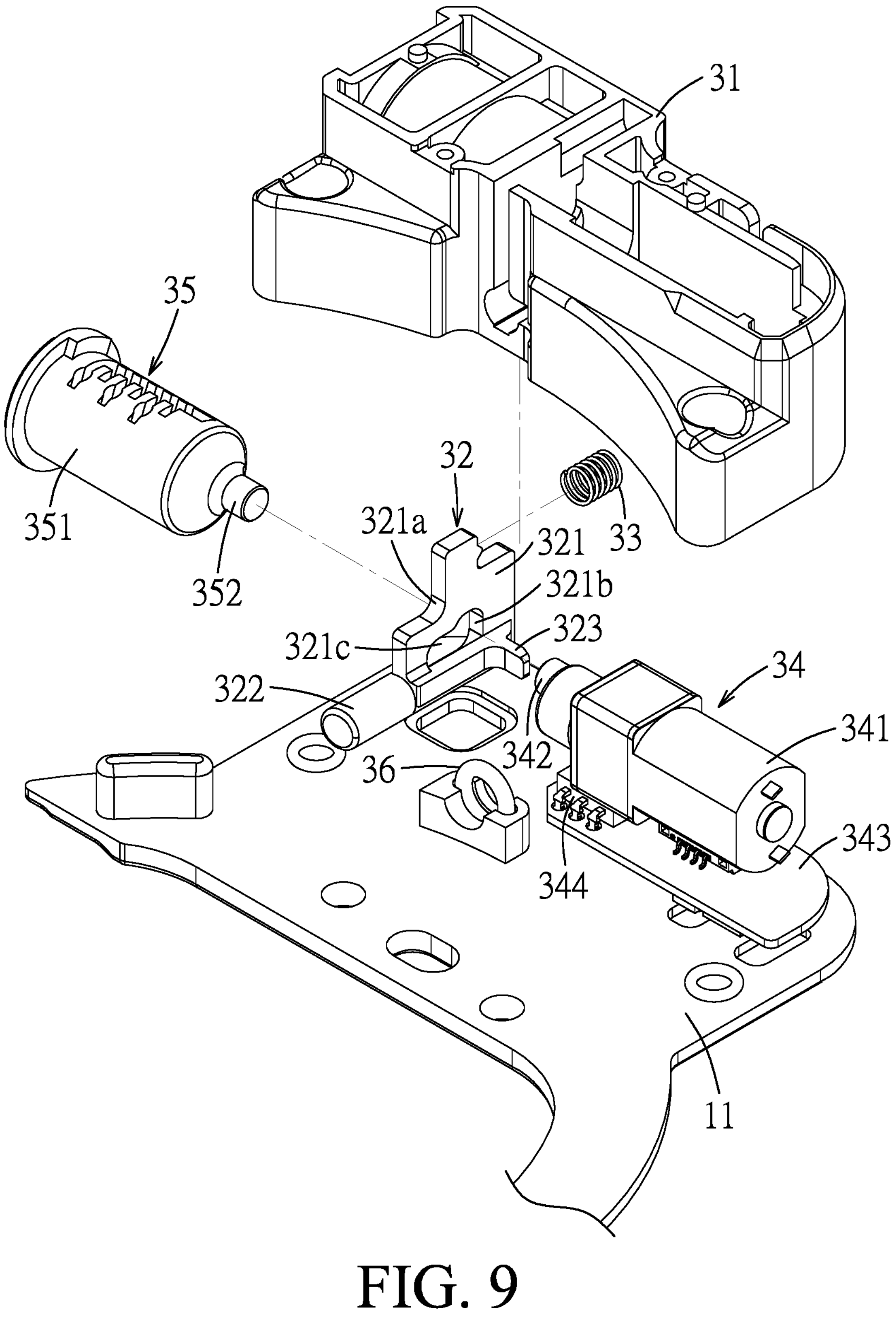
FIG. 9 is a fragmentary exploded perspective view of the base plate and the lock unit.

Referring to FIGS. 7 to 9, the lock unit 3 is disposed in the accommodating space 121*b* (see FIG. 10) and includes a mount base 31, an engaging member 32, a biasing member 33, an electric unlock module 34, and a manual unlock module 35. In this embodiment, the electric unlock module 34 and the manual unlock module 35 are mounted in the mount base 31, and are disposed respectively at opposite sides of the engaging member 32.

The engaging member 32 has a main body 321 that is disposed in the mount base 31 and a pin 322 that is connected to the main body 321. The main body 321 has a first abutment portion 321*a* and a second abutment portion 321*b*. The engaging member 32 is movable between an engaging position (see FIG. 10), where the pin 322 engages the engaging slot 211*a* (seen in FIG. 5) of the blocking member 21 while the blocking member 21 is in the block position so as to prevent movement of the blocking member 21, and an unlocked position (see FIG. 11), where the pin 322 is disengaged from the engaging slot 211*a* of the blocking member 21 so as to allow movement of the blocking member 21.

The biasing member 33 is disposed between the mount base 31 and the engaging member 32 for biasing the engaging member 32 toward the engaging position.

In this embodiment, when an external force is not applied to the blocking member 21 via the knob 22, the blocking member 21 is in the open position due to the biasing of the resilient member 23, and the biasing member 33 biases the engaging member 32 toward the engaging position such that the pin 322 slidably abuts against the arc-shaped outer wall 211 of the blocking member 21. When the user moves the blocking member 21 from the open position to the block position against the resilient force of the resilient member 23, the engaging member 32 is not limited by the blocking member 21, and is biased by the biasing member 33 to the engaging position with the pin 322 engaging the engaging slot 211*a* of the blocking member 21 so as to hold the blocking member 21 at the block position. In this embodiment, when the engaging member 32 is in the engaging position, the pin 322 extends out of the casing body 12 to engage the engaging slot 211*a* of the blocking member 21. The lock unit 3 further includes a gasket ring 36 that is mounted on the base plate 11 of the casing 1 and that is sleeved on the pin 322 to be disposed between the pin 322 and the casing body 12 for maintaining water-tightness between the pin 322 and the casing body 12 (see FIG. 10).

The electric unlock module 34 has a motor 341, a first push member 342 connected to the motor 341, and a controller 343.

In this embodiment, the first push member 342 is eccentric with a rotary axis of the motor 341, and the first push member 342 and the engaging member 32 constitute a cam mechanism. As such, operation of the motor 341 drives the first push member 342 to abut against the first abutment portion 321*a* of the main body 321 of the engaging member 32 and to linearly move the engaging member 32.

The controller 343 is electrically connected to the motor 341 for controlling operation of the motor 341. In this embodiment, the controller 343 is configured to activate the motor 341 upon receiving a wireless signal that is transmitted from, for example, a smart phone of the user, a key card, and a key fob, so that the user can control the activation of the electric unlock module 34.

Figure 10:
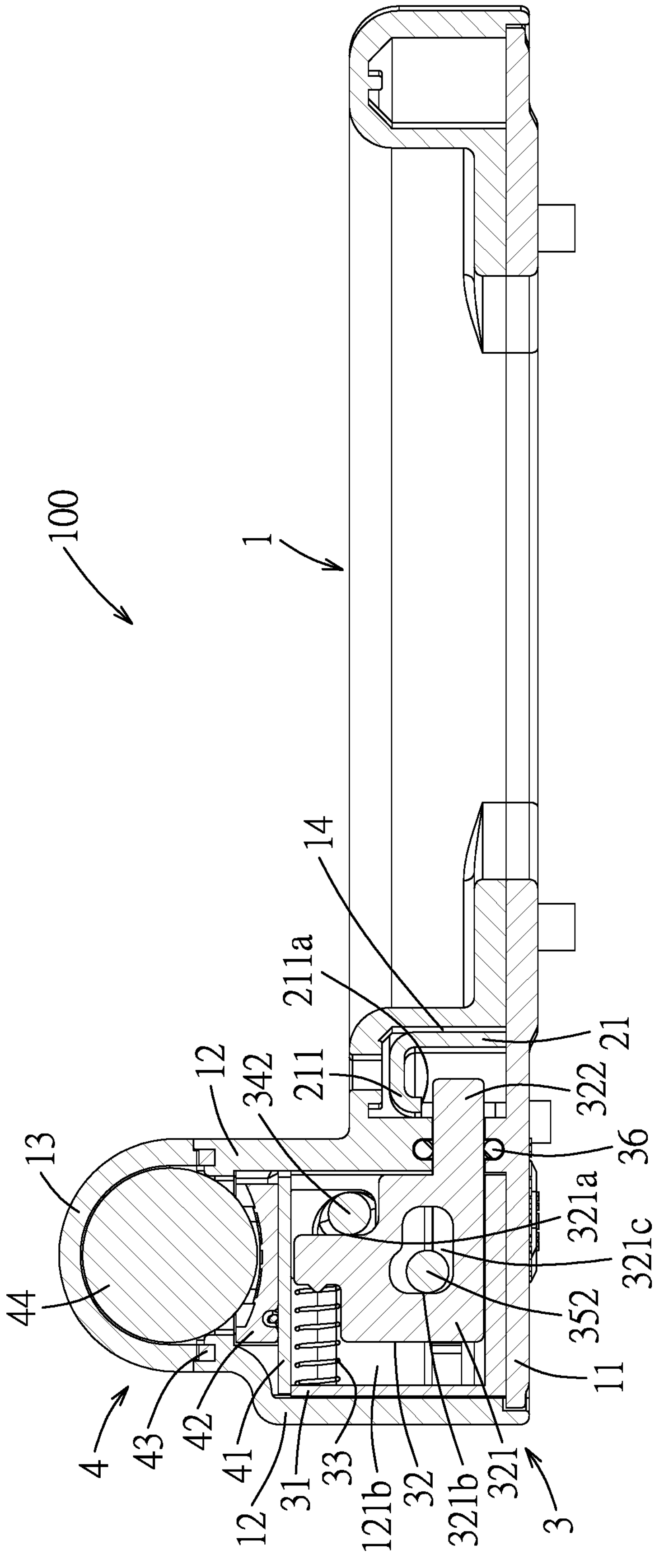
FIG. 10 is a sectional view illustrating the embodiment taken along line X-X in FIG. 2, in which an engaging member of the lock unit is in an engaging position.
Figure 11:
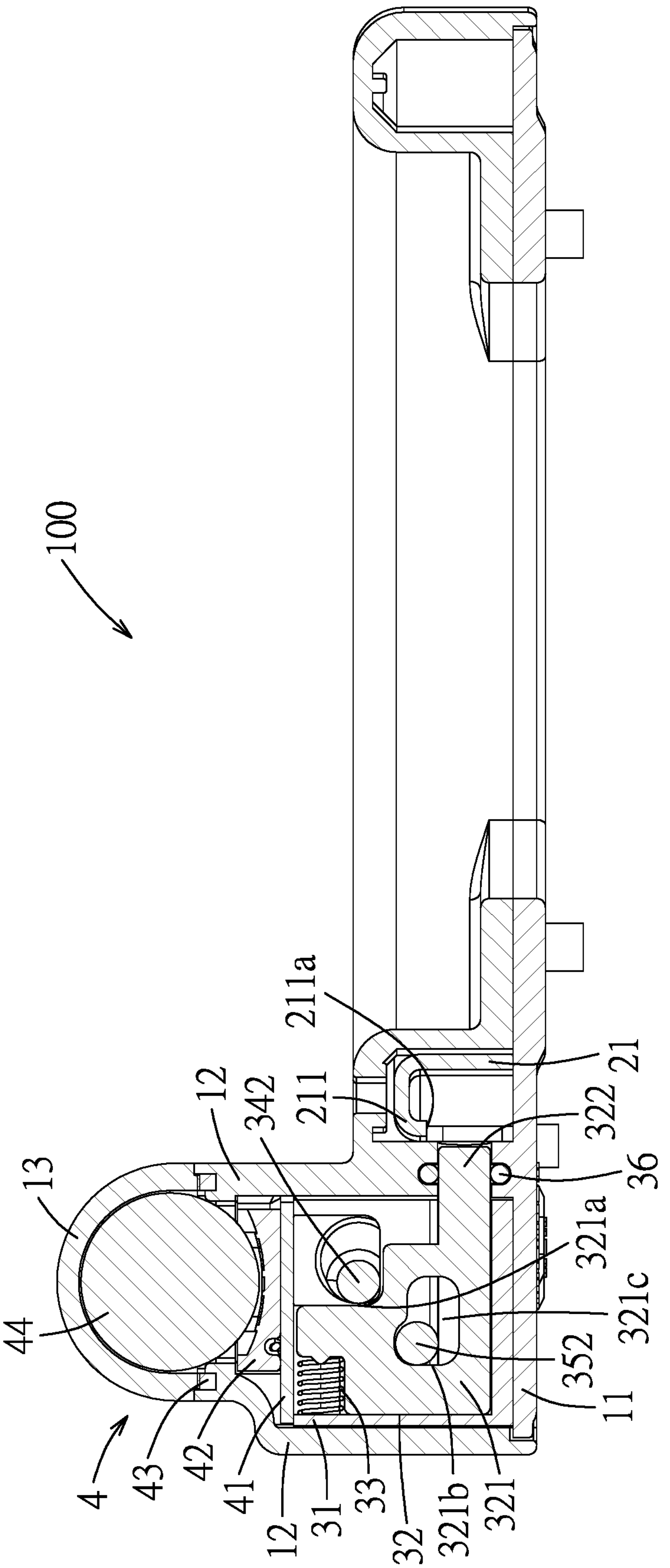
FIG. 11 is a view similar to FIG. 10, but illustrating the engaging member of the lock unit being in an unlocked position.

Referring to FIGS. 10 and 11, when the blocking member 21 is in the block position (see FIG. 2), the engaging member 32 is in the engaging position (see FIG. 10), thereby preventing the movement of the blocking member 21. When the electric unlock module 34 is activated by the user, the motor 341 drives a rotation of the first push member 342 so that the first push member 342 abuts against the first abutment portion 321*a* of the main body 321 of the engaging member 32, thereby moving the engaging member 32 to the unlocked position (See FIG. 11) against the resilient force of the biasing member 33. When the engaging member 32 moves to the unlocked position, the pin 322 is disengaged from the engaging slot 211*a* of the blocking member 21 to release the blocking member 21, and the blocking member 21 returns to the open position automatically by virtue of the resilient member 23. After the blocking member 21 returns to the open position, the motor 341 may drive the first push member 342 to rotate reversely such that the first push member 342 returns to an original position, and such that the pin 322 is biased by the biasing member 33 to once again abut against the arc-shaped outer wall 211 of the blocking member 21.

In this embodiment, the engaging member 32 further has a protruding portion 323 that protrudes from the main body 321 toward the electric unlock module 34; and the electric unlock module 34 further has a micro switch 344 that is electrically connected to the controller 343. The micro switch 344 is electrically connected to the protruding portion 323 of the engaging member 32 when the engaging member 32 is in the engaging position, and transmits a signal to the controller 343 so that the controller 343 can detect the position of the engaging member 32. Additionally, the electric unlock module 34 may further have a sensor (not shown) that can detect whether the first push member 342 is in the original position.

Referring back to FIGS. 8 and 9, the manual unlock module 35 has a lock cylinder 351 and a second push member 352. The lock cylinder 351 is rotatable and has a keyhole 351*a* adapted for insertion of a key 353 (See FIG. 3). The second push member 352 is connected co-rotatably to the lock cylinder 351, and is configured to abut against the second abutment portion 321*b* of the main body 321 of the engaging member 32 and to move the engaging member 32 toward the unlocked position.

In this embodiment, the main body 321 of the engaging member 32 has a guide groove 321*c* that is defined by a groove-defining surface, and a portion of the groove-defining surface forms the second abutment portion 321*b* of the main body 321. The second push member 352 is inserted into the guide groove 321*c* and is eccentric with a rotary axis of the lock cylinder 351. The second push member 352 and the engaging member 32 constitute a cam mechanism. As such, rotation of the lock cylinder 351, which is actuated upon rotation of the key 353, moves the second push member 352 along the guide groove 321*c* to abut against the second abutment portion 321*b* to linearly move the engaging member 32.

Referring again to FIGS. 10 and 11, when the blocking member 21 is in the block position (see FIG. 10), the second push member 352 of the manual unlock module 35 abuts against the second abutment portion 321*b* of the main body 321 of the engaging member 32. When the user rotates the lock cylinder 351 using the key 353, the second push member 352 co-rotates with the lock cylinder 351, thereby moving the engaging member 32 to the unlocked position (See FIG. 11) to thereby disengage the pin 322 from the engaging slot 211*a* of the blocking member 21 and release the blocking member 21 to move to the open position automatically by virtue of the resilient member 23. After the blocking member 21 returns to the open position, the user may rotate the key 353 reversely such that the second push member 352 returns to an original position, and such that the pin 322 is biased by the biasing member 33 to once again abut against the arc-shaped outer wall 211 of the blocking member 21.

Figure 12:
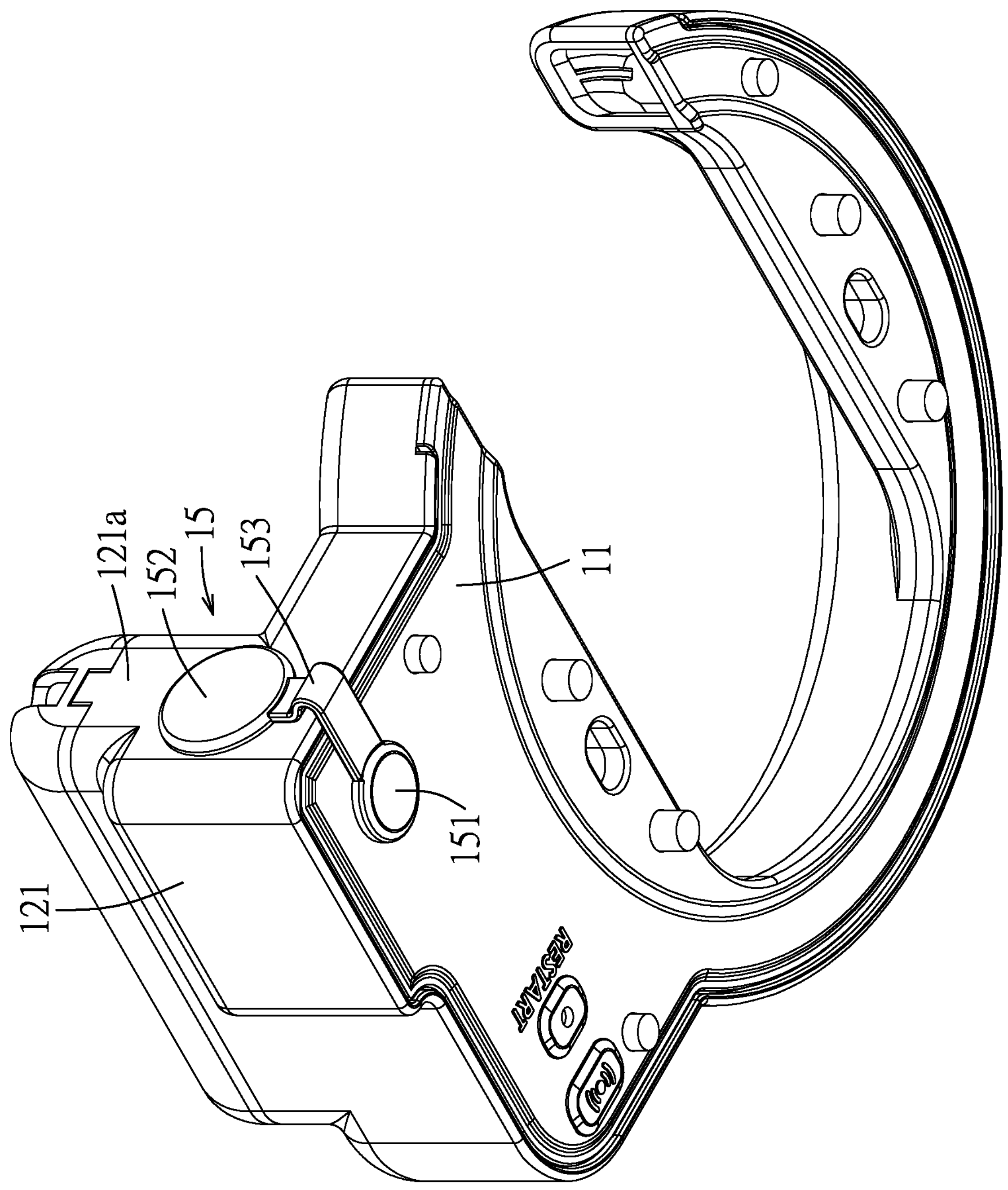
FIG. 12 is an assembled perspective view illustrating the embodiment.

Referring to FIGS. 4 and 12, the main casing part 121 of the casing body 12 further has a plug hole 121*c* extending through the surrounding wall 121*a* and aligned with the keyhole 351*a*. The base plate 11 of the casing 1 further has a fixing hole 114. The casing 1 further includes a sealing plug 15 that has a fixed portion 151 fixed to the fixing hole 114, a plug portion 152 removably fitted into the plug hole 121*c* for preventing moisture from entering the accommodating space 121*b* through the plug hole 121*c*, and a connecting portion 153 interconnecting the fixed portion 151 and the plug portion 152.

Figure 13:
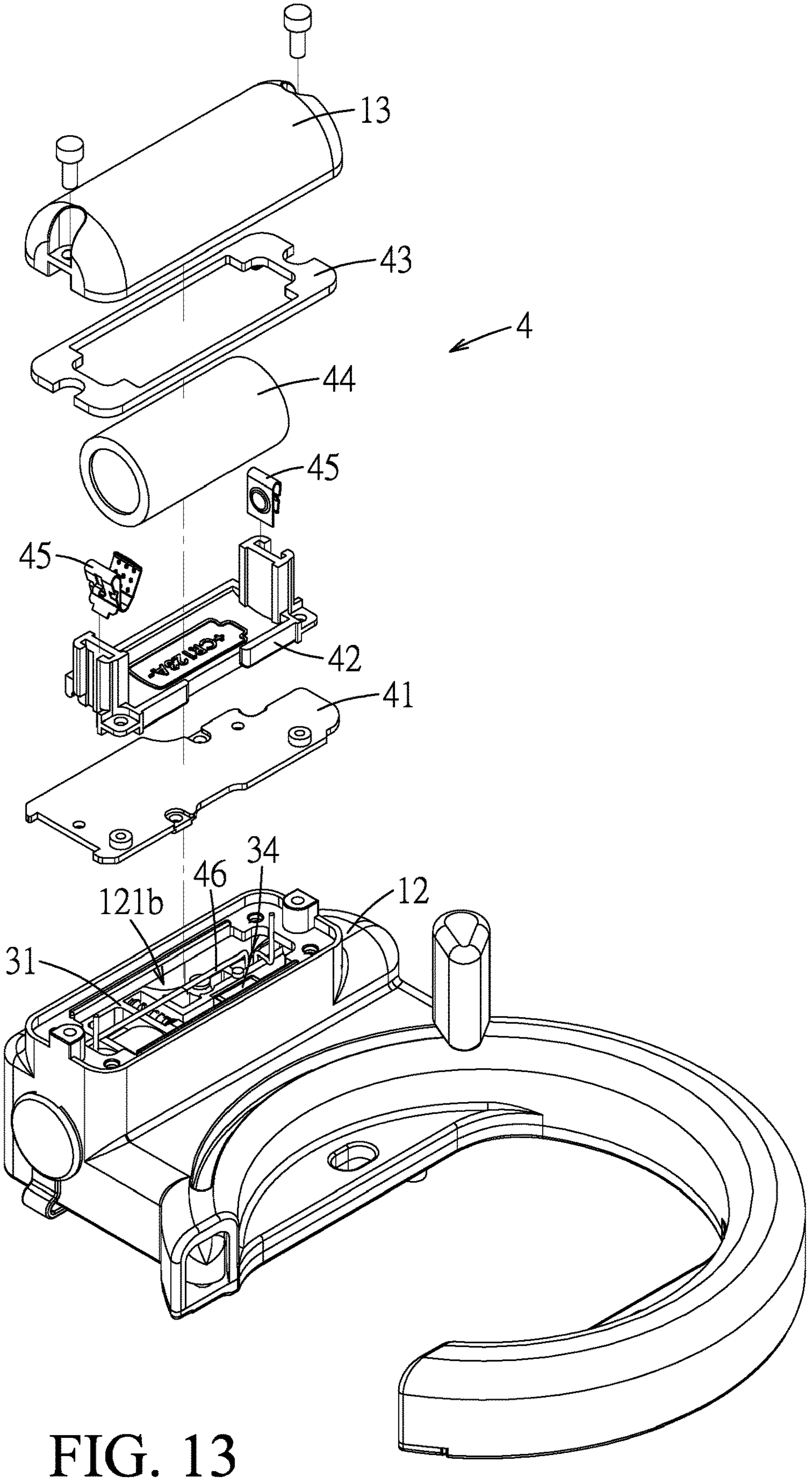
FIG. 13 is another partly exploded perspective view illustrating the embodiment.

Referring to FIGS. 3 and 13, the power supply unit 4 is disposed in the accommodating space 121*b*, and has a partition plate 41 that is mounted on the mount base 31 of the lock unit 3, a battery holder 42 that is connected to the partition plate 41 and that has a pair of electrodes 45 electrically connected to the electric unlock module 34 of the lock unit 3 via a conductive wire 46, and a sealing member 43 that is disposed between the casing body 12 and the cover body 13 of the casing 1 and that surrounds the battery holder 42 for preventing moisture from entering the accommodating space 121*b*. In use, a battery 44 is installed in the battery holder 42 to connect to the electrodes 45 for supplying electric power to the electric unlock module 34.

By virtue of the electric unlock module 34 and the manual unlock module 35, the engaging member 32 is operable by one of the electric unlock module 34 and the manual unlock module 35 to move to the unlocked position. Therefore, the user can unlock the lock assembly of the present invention remotely such as with an application installed on a smart phone of the user, and the user also can unlock the lock assembly with a physical key when remote access is not available.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lock assembly comprising:

a casing;

a blocking unit that includes a blocking member having an engaging slot and being operable to move between an open position, where said blocking member is inside said casing, and a block position, where said blocking member protrudes from said casing, and a knob extending into said casing, connected to said blocking member, and configured to be operable manually for driving said blocking member toward said block position;

a lock unit that is mounted within said casing and that includes a mount base, an engaging member having a main body that is disposed in said mount base, and a pin that is connected to said main body, said main body having a first abutment portion and a second abutment portion, said engaging member being movable between an engaging position, where said pin engages said engaging slot when said blocking member is in said block position so as to prevent movement of said blocking member, and an unlocked position, where said pin is disengaged from said engaging slot so as to allow movement of said blocking member, a biasing member disposed between said mount base and said engaging member for biasing said engaging member toward said engaging position, an electric unlock module having a motor, a first push member that is connected to said motor, said motor being operable for driving said first push member to abut against said first abutment portion of said main body of said engaging member and to move said engaging member, and a controller that is electrically connected to said motor for controlling operation of said motor, and a manual unlock module having a lock cylinder that is rotatable and that has a keyhole adapted for insertion of a key, and a second push member that is connected co-rotatably to said lock cylinder, rotation of said lock cylinder being actuated upon rotation of the key to drive said second push member to abut against said second abutment portion of said main body of said engaging member and to move said engaging member, said engaging member being operable by one of said electric unlock module and said manual unlock module to move to said unlocked position; and a power supply unit that is electrically connected to said electric unlock module.

2. The lock assembly as claimed in claim 1, wherein:

said casing includes a base plate having a main plate part and a C-shaped plate part that extends from said main plate part, a casing body having a main casing part that is coupled to said main plate part, that has a surrounding wall defining an accommodating space, and a C-shaped casing part that is coupled to said C-shaped plate part, that cooperates with said C-shaped plate part to define a track space therebetween, and that is formed with a curved slot being in spatial communication with said track space, said knob extending through said curved slot, and a cover body removably disposed on said main casing part and removably covering said accommodation space;

said blocking member of said blocking unit is disposed within said track space when in said open position, and cooperates with said C-shaped casing part to form a closed loop structure when in said block position; and said lock unit and said power supply unit are disposed in said accommodating space.

3. The lock assembly as claimed in claim 2, wherein said electric unlock module and said manual unlock module are mounted in said mount base, and are disposed respectively at opposite sides of said engaging member.

4. The lock assembly as claimed in claim 3, wherein said main body of said engaging member has a guide groove that is defined by a groove-defining surface, said second push member being inserted into said guide groove, a portion of said groove-defining surface forming said second abutment portion of said main body of said engaging member.

5. The lock assembly as claimed in claim 3, wherein:

said engaging member further has a protruding portion that protrudes from said main body toward said electric unlock module; and said electric unlock module further has a micro switch that is electrically connected to said controller and that is electrically connected to said protruding portion of said engaging member when said engaging member is in the engaging position.

6. The lock assembly as claimed in claim 3, wherein said power supply unit has a partition plate mounted on said mount base, a battery holder connected to said partition plate, and a sealing member disposed between said casing body and said cover body of said casing and surrounding said battery holder.

7. The lock assembly as claimed in claim 2, wherein:

said main casing part of said casing body further has a plug hole extending through said surrounding wall and aligned with said keyhole; and said casing further includes a sealing plug that has a fixed portion fixed to said base plate, a plug portion removably fitted into said plug hole, and a connecting portion interconnecting said fixed portion and said plug portion.

8. The lock assembly as claimed in claim 2, wherein said blocking unit further includes a resilient member connected between said blocking member and said casing for biasing said blocking member toward said open position.

9. The lock assembly as claimed in claim 8, wherein:

said blocking member further has an arc-shaped outer wall, an arc-shaped inner wall arranged at an inner side of said arc-shaped outer wall and being substantially parallel to said arc-shaped outer wall, an arc-shaped top wall interconnecting top ends of said arc-shaped outer wall and said arc-shaped inner wall, an end wall interconnecting an end of said arc-shaped outer wall, an end of said arc-shaped inner wall, and an end of said arc-shaped top wall, and an extension wall extending from another end of said arc-shaped top wall and connected to another end of said arc-shaped outer wall and another end of said arc-shaped inner wall;

said engaging slot is formed in said arc-shaped outer wall;

said knob is connected to said arc-shaped top wall; and said resilient member has an end connected to said extension wall and an opposite end connected to said casing.

10. The lock assembly as claimed in claim 9 wherein:

said base plate further has a stopper block that protrudes from said C-shaped plate part into said track space; and when said blocking member is in said open position, said end wall of said blocking member abuts against said stopper block, thereby positioning said blocking member relative to said casing.

* * * * *